(12) United States Patent
Korcz

(10) Patent No.: US 7,301,099 B1
(45) Date of Patent: Nov. 27, 2007

(54) ELECTRICAL BOX MOUNTING PLATE

(75) Inventor: Krzysztof W. Korcz, Granger, IN (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/478,525

(22) Filed: Jun. 30, 2006

(51) Int. Cl.
*H01H 9/02* (2006.01)

(52) U.S. Cl. .................. 174/58; 174/66; 174/67; 174/135; 33/528; 220/241

(58) Field of Classification Search ............. 174/66, 174/67, 58, 50, 53, 135; 220/241, 242, 3.8; 33/528, DIG. 10
See application file for complete search history.

(56) References Cited

U.S. PATENT DOCUMENTS

| | | | | |
|---|---|---|---|---|
| 6,031,183 A * | 2/2000 | Guerrieri | ................ | 174/67 |
| 6,166,329 A * | 12/2000 | Oliver et al. | ................ | 174/58 |
| 6,608,252 B2 * | 8/2003 | Hurley | ................ | 174/58 |
| 6,683,248 B2 * | 1/2004 | Vrame et al. | ................ | 174/50 |
| 6,878,878 B2 * | 4/2005 | Westlake | ................ | 174/66 |
| 6,974,910 B2 * | 12/2005 | Rohmer | ................ | 174/66 |

* cited by examiner

*Primary Examiner*—Dhiru R. Patel
(74) *Attorney, Agent, or Firm*—Garrett V. Davis; Mark S. Bicks; Alfred N. Goodman

(57) ABSTRACT

An electrical box assembly includes an adjustable electrical box cover. The cover includes a base plate having a central opening and a collar encircling the central opening. A sleeve slides through the collar and is adjusted by a plurality of adjustment screws. In one embodiment, the adjustment screws are positioned between the sleeve and the collar. In another embodiment, the sleeve and collar have inwardly extending tabs to receive the adjustment screws.

26 Claims, 10 Drawing Sheets

ELECTRICAL BOX MOUNTING PLATE

FIELD OF THE INVENTION

The present invention is directed to an adjustable electrical outlet box cover plate that can be attached to a conventional electrical junction box. The invention is further directed to an adjustable electrical box cover plate having a movable sleeve for allowing adjustment of the electrical device to compensate for different wall thicknesses to set the electrical device at the desired position in relation tot eh exterior surface of the wall

BACKGROUND OF THE INVENTION

Electrical boxes are commonly mounted to a stud or other support structure for supporting an electrical device and enclosing electrical wiring. The electrical boxes are often mounted in a variety of positions and locations in the wall or ceiling. The electrical box is typically attached to the stud or other support structure by nails, screws or other fasteners. In new construction, the electrical box is attached to the building stud with the open front face of the electrical box positioned so that the outer face of the drywall or paneling is essentially flush with the outer edge of the electrical box. In some forms of construction, the stud or other structure does not allow proper orientation of the electrical box so that the open end of the electrical box is recessed with respect to the outer surface of the wall when the wall is installed and finished.

Renovating old construction also can create difficulties in positioning the electrical box with respect to the outer surface of the wall. New wall board or paneling can be applied over existing walls so that the original electrical box is recessed within the wall and is not easily moved or relocated. The recessed electrical box results in the electrical device being recessed with respect to the wall and is not easily accessible.

A number of devices have been proposed providing an adjustable assembly for connecting to an outlet box that can accommodate four different thicknesses of wall structures and the spacing between the outer surface of a wall and an electrical box. One example is disclosed in U.S. Pat. No. 4,634,015 to Taylor which includes a plate and an open collar disposed on the mounting plate about a central opening. A box frame slides within the collar to contact the side walls of the collar. Adjustment screws are mounted in the box to connect the frame to the collar or the mounting plate to move the box outwardly of the collar.

Another example is disclosed in U.S. Pat. No. 5,931,325 to Filipov. This patent discloses an adjustable mud ring for an electrical box having a plate that can be attached to an electrical box and a collar extending outwardly from the plate. A movable sleeve surrounds the collar and is attached to the collar by screws that adjust the position.

Still another example is disclosed in U.S. Pat. No. 6,820,760 to Wegner et al. which discloses an electrical box extension having an extending member for a switch and/or electrical receptacle. The extension member includes fastener brackets and a fastener base bracket. Fasteners extend through the fastener brackets of the base bracket to adjust the relative position of the extending member to the base. Similar adjustable electrical box extensions are disclosed in U.S. Patent Application Publication No. 2005/0051354 and 2005/0082079 to Wegner et al.

Examples of other electrical boxes having an adjustable sleeve or collar to position the electrical device with respect to the electrical box are disclosed in U.S. Pat. No. 915,381 to Pullets, U.S. Pat. No. 740,663 to Krantz, U.S. Pat. No. 1,875,101 to Morrell, and U.S. Pat. No. 2,707,221 to Frank.

While each of the prior devices have been generally suitable for the intended purpose, there is a continuing need in the industry for an improved device for mounting an electrical component to an electrical box.

SUMMARY OF THE INVENTION

The present invention is directed to an electrical box cover plate for coupling directly to an existing electrical box. The invention is further directed to an electrical box having an adjustable assembly for accommodating the depth of the wall structure and the spacing between the outer surface of the wall and the electrical box.

Accordingly, one aspect of the invention is to provide an electrical box cover plate for attaching to an electrical box and having a telescoping member for adjusting the position of the electrical device with respect to the electrical box. The telescoping member also permits the adjustment of the electrical device with respect to the surface of the wall.

A further feature of the invention is to provide an electrical box cover plate where the cover plate has a central opening and a collar surrounding the opening. A sleeve is slidable within the collar and can move between a retracted position within the electrical box to an extended position.

The electrical box cover plate of the invention includes a cover plate having a central opening and a collar surrounding the opening and having a sliding sleeve within the collar for supporting the electrical device. The sleeve is movable from a retracted position where the top edge of the sleeve is essentially flush with the top edge of the collar and can be moved to an extended position outwardly from the collar to accommodate various thicknesses of a wall structure to position the electrical device flush with the outer surface of the wall structure.

A further feature of the invention is to provide an electrical box cover plate having a central opening with a collar surrounding the opening and a movable sleeve within the collar where the movable sleeve is selectively adjusted by at least one adjustment screw having one end captured and being axially fixed so that rotation of the screw moves the sleeve with respect to the collar. In one embodiment, one end of the adjustment screw is coupled to the collar in a manner to be rotatable while being axially fixed. The adjustment screw is received in a threaded hole in the sleeve so that rotation of the screw moves the sleeve with respect to the collar. In an alternative embodiment, the adjustment screw is coupled to the sleeve to be rotatable while being axially fixed to the sleeve. The adjustment screw is threaded into a threaded hole in the collar so that rotation of the screw adjusts the position of the sleeve with respect to the collar.

The electrical box mounting plate of the invention is typically made of sheet metal that is stamped then folded into a desired form. In one form of the invention, the base plate is formed with a central opening having two opposing tabs that are folded perpendicular to the plane of the base plate to form two opposing walls of the collar. Separate wall members are then attached to the ends of the opposing side walls that are integrally formed with the base plate to define the collar on the base plate. In one embodiment, a leg extends from an end wall of the collar and includes an inwardly extending tab with a hole for receiving the adjustment screw.

In one form of the invention, the electrical box mounting plate includes a central opening with a collar surrounding the opening. A tab is formed from at least one side wall of the collar and is bent inwardly into the central opening of the base plate. The tab includes a threaded hole for receiving the adjustment screw.

The movable sleeve is typically formed of metal from a blank that is folded in one embodiment into a rectangular shape. The sleeve can be square, round or any other shape depending on the intended use. In one form of the invention, the top end of the sleeve includes a mounting plate for supporting the electrical device and a tab spaced from the mounting plate. The tab includes an aperture for the adjustment screw so that the head of the adjustment screw is captured between the mounting plate and the tab so that rotation of the adjustment screw moves the sleeve with respect to the base plate.

These and other aspects of the invention are basically attained by providing an adjustable electrical box cover plate for coupling to an electrical box. The cover plate comprises a planar base plate having an outer face, an inner face and a central opening having a dimension sufficient to receive an electrical device. The base plate is adapted for coupling to the electrical box. A collar surrounds the central opening and extends axially from the outer face of the base plate. The collar has an inwardly extending tab at opposite corners of the central opening having an aperture therein. A sleeve is slidingly received in the collar and is movable axially within the collar. The sleeve has a tab at a bottom edge with a threaded hole therein at opposite corners of the sleeve and aligned with the tabs of the collar. A threaded screw is received in each threaded hole of the tab of the sleeve. An end is rotatably coupled with and axially fixed with respect to the tab. Rotation of the screw adjusts the sleeve axially with respect to the collar.

The various aspects of the invention are also attained by providing an electrical box cover plate comprising a base plate having an outer face, an inner face and a plurality of coupling members for coupling the plate to an electrical box. The base plate has a central opening. A first side wall is integrally formed with a first edge of the central opening. A second side wall is integrally formed with a second opposite edge of the central opening and is substantially parallel to the first side wall and perpendicular to the base plate. A third side wall is formed as a separate member and is coupled to a third edge of the central opening and to first ends of the first and second side walls. A fourth side wall is formed as a separate member and is coupled to a fourth edge of the central opening and to a second end of the first and second side walls, The first, second, third and fourth side walls define a collar extending from the outer face of the base plate. First and second tabs are integrally formed with the collar and extend inwardly with respect to the central opening and have an aperture therein. A sleeve is received within the central aperture and has an integrally formed tab aligned with each of the tabs of the side walls and have an aperture therein. An adjusting screw is received in each aperture of the tab of the sleeve and cooperates with an aligned opening in the tabs of the collar for telescopically adjusting the position of the sleeve with respect to the collar.

The various features of the invention are further attained by providing an electrical box cover plate for coupling to an electrical box. The cover plate comprises a base plate having an outer face, an inner face and a central opening having a dimension for receiving an electrical device. First and second opposite side walls are integrally formed with opposite side edges of the central opening and extend substantially perpendicular to the base plate. Third and fourth opposite side wall members are separately formed from the base plate and are attached to opposite ends of the first and second side walls and to opposite side edges of the central opening. The first, second, third and fourth side walls form a collar extending from the outer face of the base plate and encircle the central opening. At least one leg extends from the collar away from the inner face of the base plate and has a tab extending inwardly with respect to the central opening. The tab has a an opening therein. A sleeve is slidably received in said collar and has a top edge for mounting an electrical device. The sleeve has at least one tab extending inwardly with respect to the sleeve and has a threaded aperture. A threaded screw has a first end rotatably coupled and axially fixed to the tab of the leg and is threadedly coupled to the tab of the sleeve. Rotation of the screw adjusts the axial position of the sleeve with respect to the collar.

The various aspects of the invention are yet further attained by providing an electrical box and adjustable cover plate assembly comprising an electrical box having an open top end and having an inner cavity for receiving electrical wiring. A cover plate assembly comprises a planar base plate having an outer face and an inner face and a central opening. The base plate has a dimension to cover the open top end of the electrical box. First and second opposite side walls are integrally formed with opposite side edges of the central opening and extend substantially perpendicular to the base plate, and opposite side edges perpendicular to the top edge. Third and fourth opposite side wall members are separately formed from the base plate and are attached to the opposite side edges of the first and second side walls and to respective edges of the central opening. The first, second, third and fourth side walls form a collar extending from the base plate. The collar has a tab extending inwardly at opposite corners of the collar and have an opening therein. A sleeve is slidably received in the collar and is movable from a retracted position where a top edge of the sleeve is substantially aligned with the top edge of the collar and an extended position where the top edge of the sleeve is spaced from the top edge of the collar. A tab extends from opposite corners of the sleeve and have an opening. Threaded adjustment screws are received in the opening in respective tabs in the sleeve and respective tabs in the collar. The screws are positioned between an inner surface of the collar and an outer surface of the sleeve. Each screw is axially fixed to one of the tabs.

These and other aspects and salient features of the invention will become apparent from the following detailed description of the invention, which taken in conjunction with the annexed drawings, disclose various embodiments of the invention.

BRIEF DESCRIPTION OF THE DRAWINGS

The following is a brief description of the drawings, in which.

DETAILED DESCRIPTION OF THE INVENTION

The present invention is directed to an adjustable electrical box cover plate that can be used to accommodate four different thicknesses in wall structure. The invention is particularly directed to an electrical box cover plate that can adjust the position of the electrical device with respect to the electrical box and the wall surface.

Figure 1:
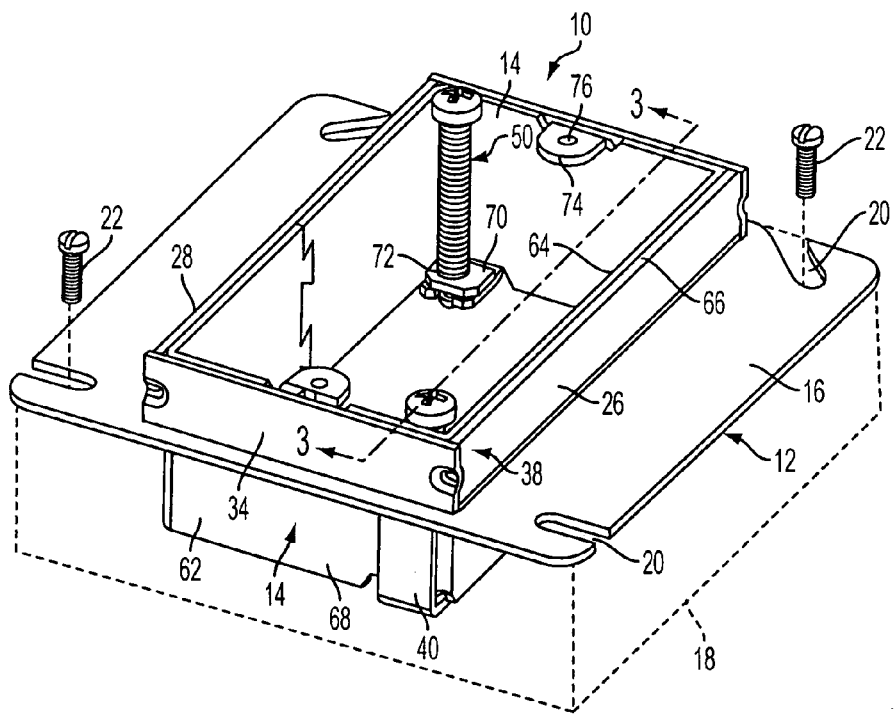
FIG. 1 is a perspective view of the electrical box cover plate in a first embodiment of the invention showing the sleeve recessed in the collar of the base plate.

The cover plate assembly 10 of the invention basically includes a cover plate 12 and a movable sleeve 14 as shown in FIG. 1. The position of the sleeve is adjustable with respect to the cover plate 12.

Referring to FIGS. 1-5, a first embodiment of the invention is shown. The cover plate 12 of the cover plate assembly 10 includes a planar base plate 16 which has a shape and dimension for connecting and covering an electrical box 18. Electrical box 18 is a conventional electrical box for enclosing wiring for the electrical device mounted on the cover plate 12. In the embodiment illustrated, base plate 16 has a substantially square configuration for mounting on a square electrical box. The corners of base plate 16 include a slot 20 for receiving mounting screws 22 to attach base plate 16 to electrical box 18 in a conventional manner. The shape and size of the base plate 16 is selected to correspond to the shape of the electrical box.

Figure 4:
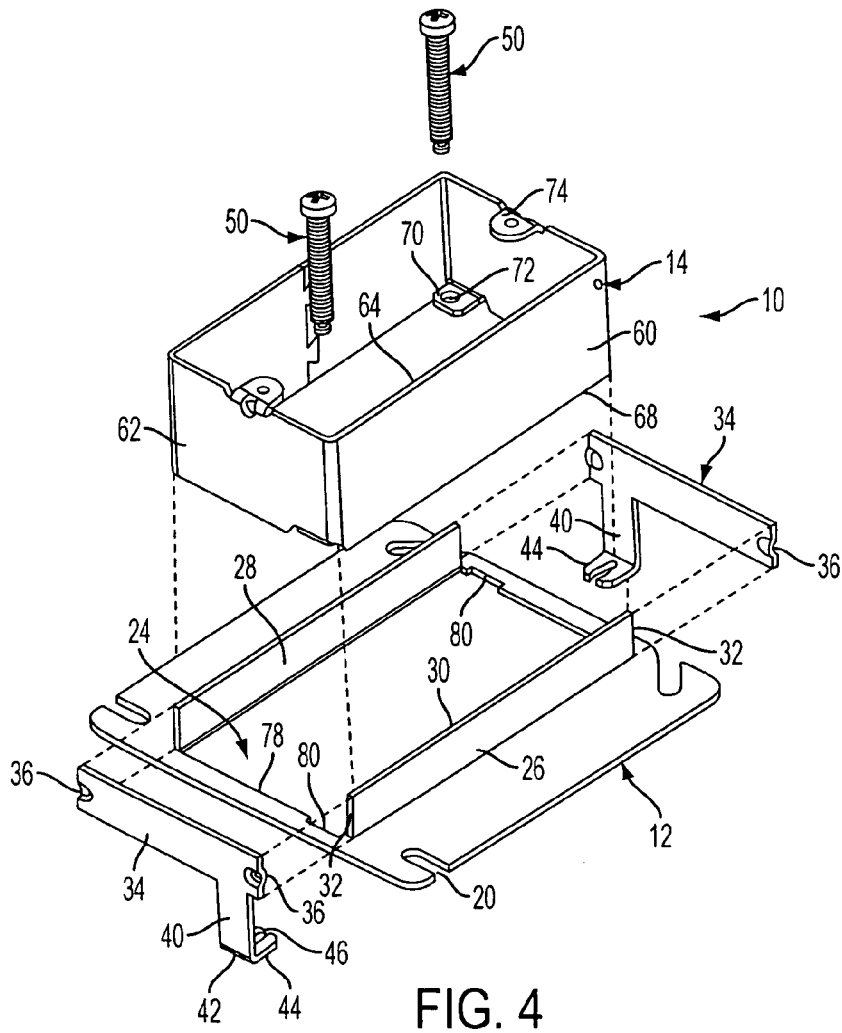
FIG. 4 is a perspective exploded view of the base plate partially assembled.

Base plate 16 is typically formed of sheet metal that is cut and stamped to form the desired shape. Base plate 16 is formed with a central opening 24. Central opening 24 has a dimension to receive sleeve 14 and to accommodate the electrical device. As shown in FIG. 4, central opening 24 is formed by cutting a central portion from base plate 16 to form a pair of flanges that are bent perpendicular to the plane of base plate 16 to form opposite side walls 26 and 28. As shown the side walls 26 and 28 are formed from the material that is removed to form central opening 24. Side walls 26 and 28 are integrally formed with base plate 16 and extend substantially perpendicular thereto. Side walls 26 and 28 have a top edge 30 and end faces 32. As shown in FIG. 4, side walls 26 and 28 have a length substantially equal to the length of central opening 24.

Figure 2:
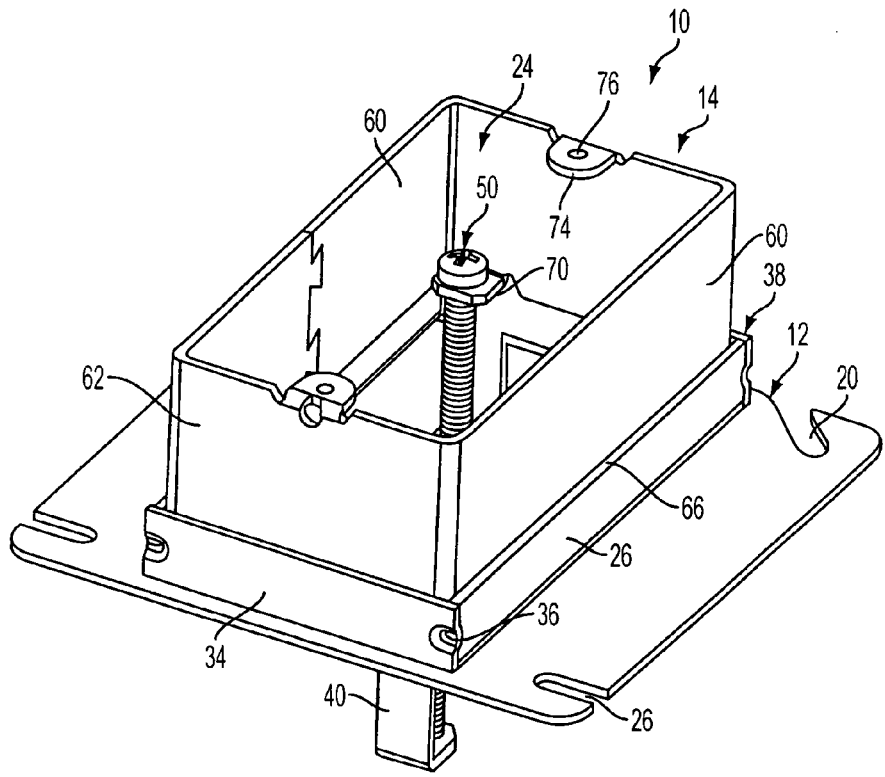
FIG. 2 is a perspective view of the electrical box cover plate of the embodiment of FIG. 1 showing the sleeve in the extended position.

End walls 34 are formed as separate elements and attach to the respective end faces 32 of side walls 26 and 28. End walls 34 have a length to join to the end faces 32 of side walls 26 and 28 and a height substantially equal to the side walls. End walls 34 are attached to side walls 26 and 28 by a suitable coupling mechanism such as crimping to form a detent 36 or by spot welding. As shown in FIGS. 1 and 2, end walls 34 are joined to side walls 26 and 28 to form a collar extending upwardly from the top face of base plate 16. In the embodiment shown, collar 38 has a substantially rectangular configuration. The height of collar 38 corresponds generally to the standard thickness of wall board or other wall construction material which is generally about one-half inch.

Figure 3:
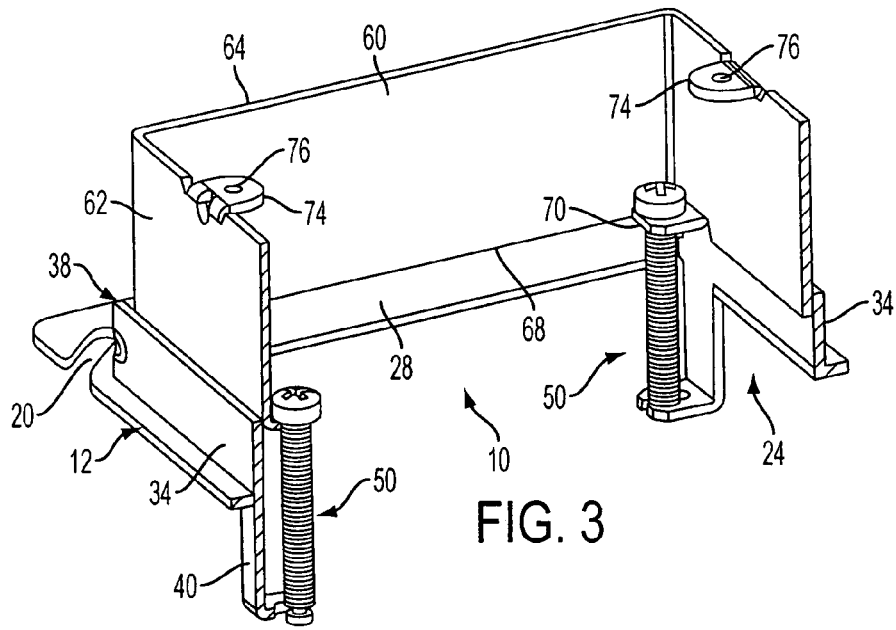
FIG. 3 is a cross-sectional view of the electrical box cover plate taken along line 3-3 of FIG. 2.
Figure 5:
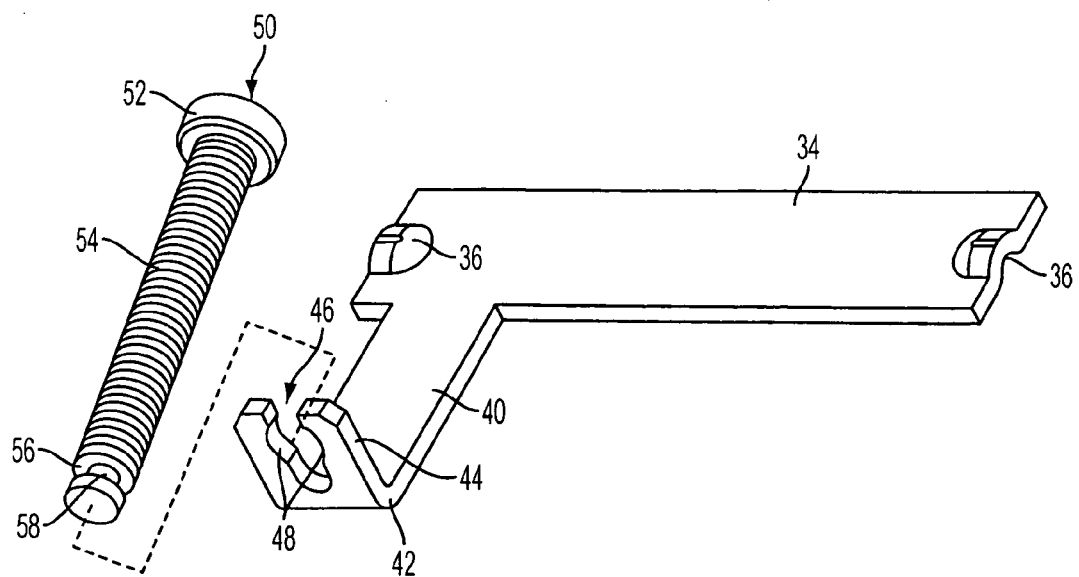
FIG. 5 is a perspective view of the end wall member of the collar and the adjustment screw.
Figure 6:
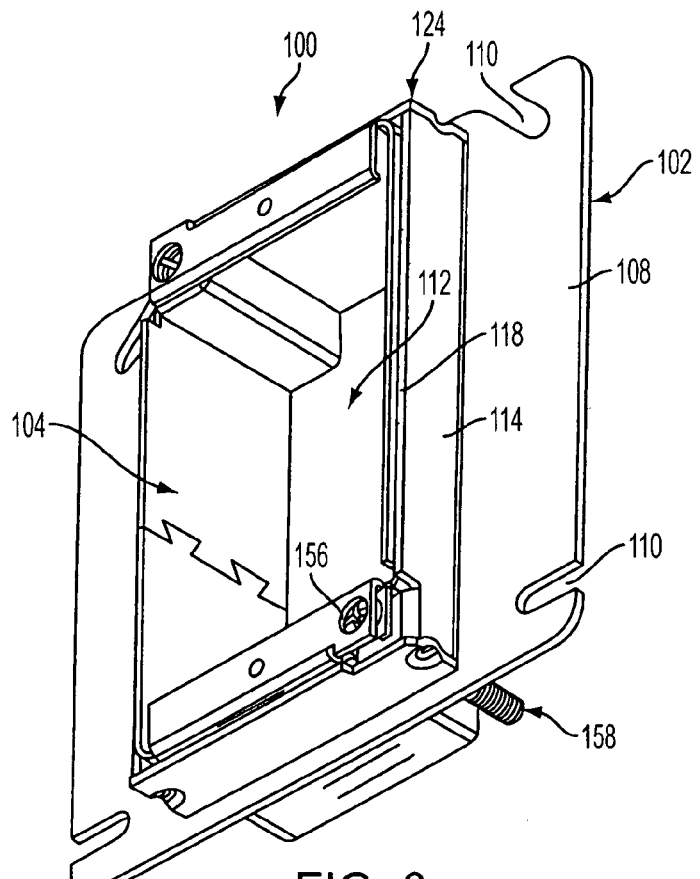
FIG. 6 is a perspective view of the electrical box cover plate in a second embodiment of the invention showing the sleeve in a recessed position.
Figure 7:
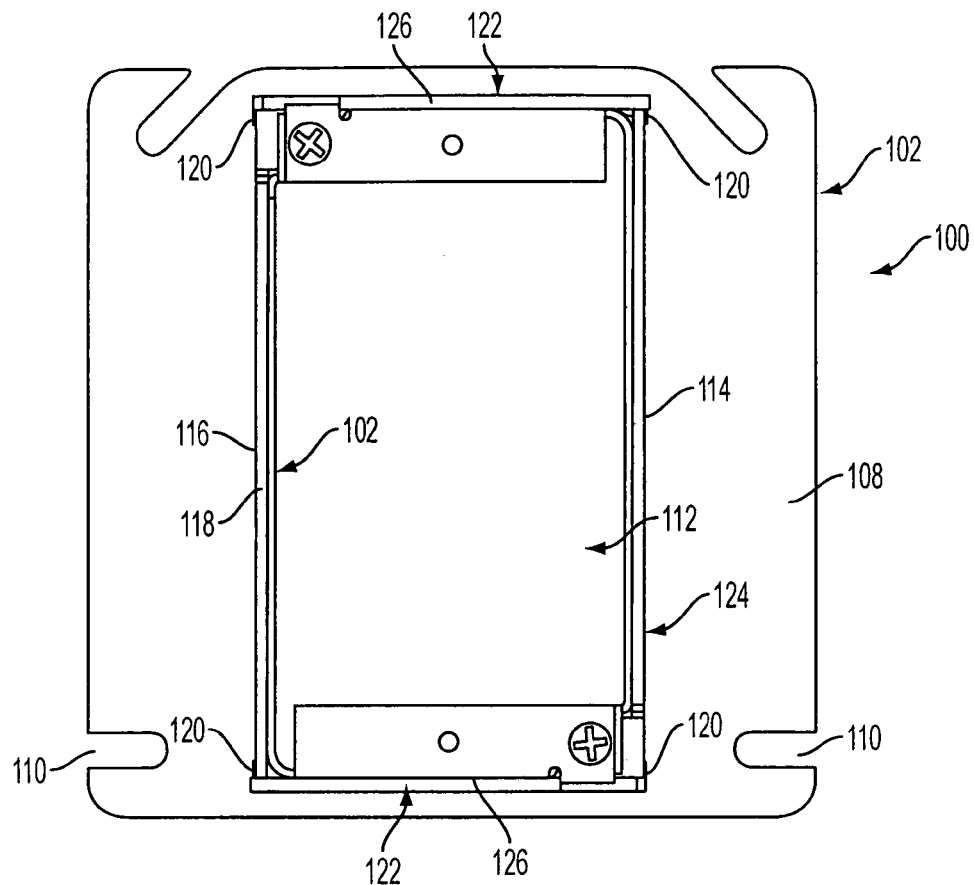
FIG. 7 is a top plan view of the electrical box cover plate of the embodiment of FIG. 6.

Referring to FIG. 5, end walls 34 are formed from a single sheet of metal or other material that are cut and bent to form the desired shape. End walls 34 include a leg in close proximity to one end of the respective end wall 34. Leg 40 is coplanar with the plane of end walls 34 and has a length to extend below base plate 16 as shown in FIGS. 1 and 2. Leg 40 has a bottom end 42 with a tab 44 extending perpendicular to leg 40. Tab 44 and leg 40 are integrally formed with end walls 34 from a single piece of material. Tab 44 is bent in a direction to extend inwardly with respect to central opening 24 as shown in FIG. 3. Tab 44 includes an elongated slot 46 with opposing concave recessed areas 48. Recessed areas 48 have a dimension to receive an end of an adjustment screw 50 as discussed hereinafter in greater detail. As shown in FIG. 5, adjustment screw 50 has a head 52, a threaded body 54, and an annular recess 56 at an end opposite head 52. Annular recess 56 has a cylindrical center portion 58 that has a dimension to fit within the concave recessed area 48 to capture the end of adjustment screw 50 in the tab while allowing rotation of the adjustment screw with respect to tab 44.

Sleeve 14 has a substantially rectangular configuration to slide within the central opening 24 and within collar 38. Sleeve 14 has a pair of opposite side walls 60 and opposite end walls 62 joined to the ends of side walls 60. In one embodiment, sleeve 14 is formed of metal or other sheet material and is folded from a blank so that the side walls and end walls are integrally formed together. As shown in FIGS. 1 and 2, sleeve 14 has a height greater than the height of collar 38 and is able to slide from a retracted position shown in FIG. 1 to an extended position shown in FIG. 2. In the retracted position shown in FIG. 1, a top edge 64 of sleeve 14 is substantially aligned with a top edge 66 of collar 38 while a bottom edge of sleeve 14 abuts tab 44 in the retracted position.

Sleeve 14 is formed with inwardly extending tabs 70 at opposite corners along the bottom edge 68 of sleeve 14. Tabs 70 include a threaded hole 72 to receive the adjustment screw 50. In the embodiment illustrated, tabs 70 extend from end walls 62. In alternative embodiments, tabs 70 can be integrally formed and extend from side walls 60. Tabs 70 are positioned to overlie tab 44 of leg 40 so that adjustment screw 50 is aligned with slot 46 in tab 44 and threaded hole 72 in tab 70 as shown in FIG. 1.

End wall 62 of sleeve 44 includes mounting tabs 74 extending from top edge 64. Mounting tabs 74 are positioned on opposite end walls 62 and include a threaded aperture 76 for mounting an electrical device such as a switch or duplex receptacle.

As shown in FIG. 4, central opening 24 is defined by edges 78 which have a recessed area 80 with a dimension for receiving leg 40 of end walls 34 so that leg 40 does extend into or obstruct central opening 24. Recess 80 preferably has a depth equal to the thickness of the leg 40. In this manner, end walls 34 contact the top surface of base plate 16 with the respective leg 40 extending through recess 80 while the ends of side walls 34 are coupled to the ends of first and second side walls 26 and 28. Legs 40 of end walls 34 have a length to extend into electrical box 18 without interfering with the attachment of base plate 16 to the top end of electrical box 18. Adjustment screws 50 into the respective threaded hole 72 of tabs 70 and the center portion 58 of annular recess of threaded body 64 is positioned within slot 46 as shown in FIG. 3. The side portions of tab 44 defining slot 46 can be pinched or compressed toward each other to capture adjustment screw 50 to prevent axial movement of adjustment screw 50 with respect to tab 46 while allowing rotation of the adjustment screw.

In use, electrical box 18 is mounted to a wall stud or other support structure and positioned so that the electrical device is appropriately positioned with respect to the outer surface of the wall structure. In some construction, and particularly remodeling construction, the position of the wall stud or support structure limits the location of the electrical box so that the electrical box is recessed within the wall. In this situation, adjustment screws 50 are rotated to extend sleeve 14 outwardly until the top edge of the sleeve 14 is substantially flush with the outer surface of the wall and the electrical device mounted to the sleeve 14 is readily accessible. Suitable wall material such as plaster can be applied around the sleeve 14 and collar 38 to finish the wall surface without interfering with the electrical box or the electrical device mounted to the sleeve 14. Thus, the sleeve 14 and collar can function as a mud ring for the electrical box.

Referring to FIGS. 6-21, a second embodiment of the invention is illustrated. In this embodiment, the electrical cover plate assembly 100 includes a cover plate 102 and a movable sleeve 104. As in the previous embodiment, cover plate 102 is constructed for attaching to an electrical box 106.

Cover plate 102 includes a base plate 108 having a substantially planar configuration. In the embodiment illustrated, base plate 108 is substantially square and includes slots 110 in each of the corners for receiving a screw to attach base plate 108 to electrical box 106. Although base plate 108 is shown as having a square configuration, the base plate can be round or rectangular to accommodate the shape of the electrical box that the base plate is to be attached.

Base plate 108 is formed with a central opening 112 having a substantially rectangular configuration in the embodiment shown although other configurations can be used. Central opening 112 has a dimension and shape to accommodate sleeve 104 as discussed hereinafter in greater detail. Base plate 108 is formed from a sheet of steel with flanges formed on opposite sides of central opening 112 that are bent upwardly perpendicular to the plane of base plate 108 to form side walls 114 and 116. Side walls 114 and 116 have a length substantially equal to the length of central opening 112 and have a longitudinal top edge 118 and opposite end faces 120. In the embodiment illustrated, side walls 114 and 116 are integrally formed with base plate 108.

Figure 11:
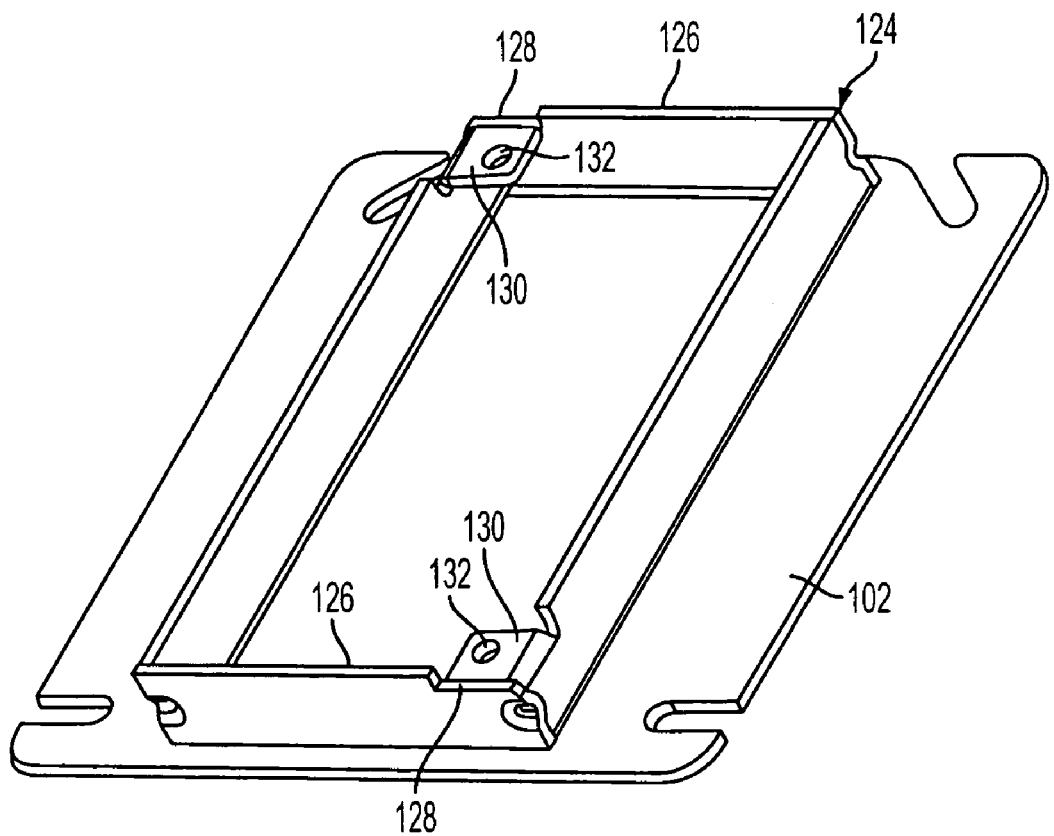
FIG. 11 is a perspective view of the base plate and collar of FIG. 10.
Figure 12:
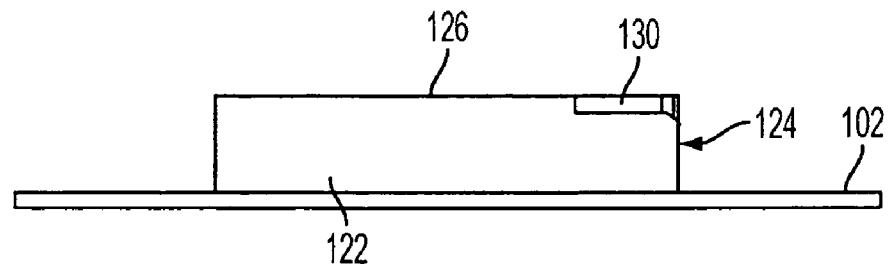
FIG. 12 is an elevational end view of the base plate of FIG. 10.
Figure 13:
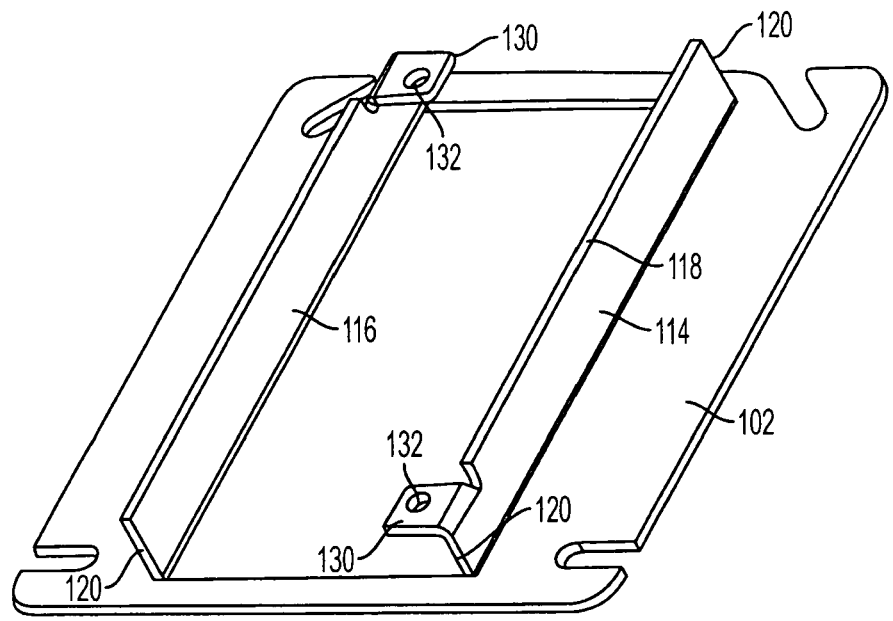
FIG. 13 is a perspective view of the base plate in the partially assembled condition without the end walls assembled.

End walls 22 are attached to the end faces 120 of side walls 114 and 116 to define a collar 124. Collar 124 encircles central opening 112 and extends substantially perpendicular to the plane of base plate 108. End walls 122 are formed as separate members that are attached to end faces 120 by crimping as shown in FIG. 11, spot welding or other attachment means. End walls 122 have a length to extend between side walls 114 and 116 and a height substantially equal to the height of side walls 114 and 116. In this embodiment, end walls 122 contact the outer face of base plate 108 adjacent the edge of central opening 112.

Figure 10:
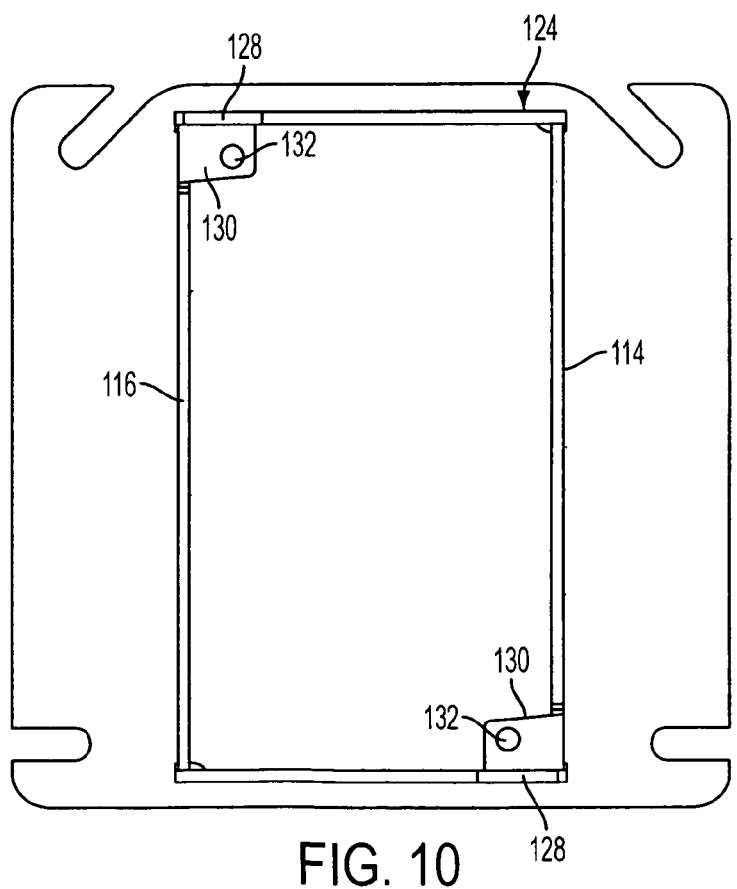
FIG. 10 is a top plan view of the base plate and collar with the sleeve removed.

As shown in FIGS. 10 and 11, end walls 122 have a top edge 26 with a notch formed at one end and are positioned in opposite corners of central opening 112. Notch 128 has an edge extending parallel to top edge 126 and extends inwardly from the end of each end wall 122. Side walls 114 and 116 are formed with an integral tab 130 that is bent inwardly with respect to central opening 122. Tabs 130 extend substantially perpendicular to side walls 112 and 114 and parallel to the top surface of base plate 108. Tabs 130 have a length substantially equal to the length of notch 128 and are aligned with the top edge of notch 128. A threaded hole 132 is formed in each tab 130 for receiving an adjustment screw as discussed herein.

Figure 14:
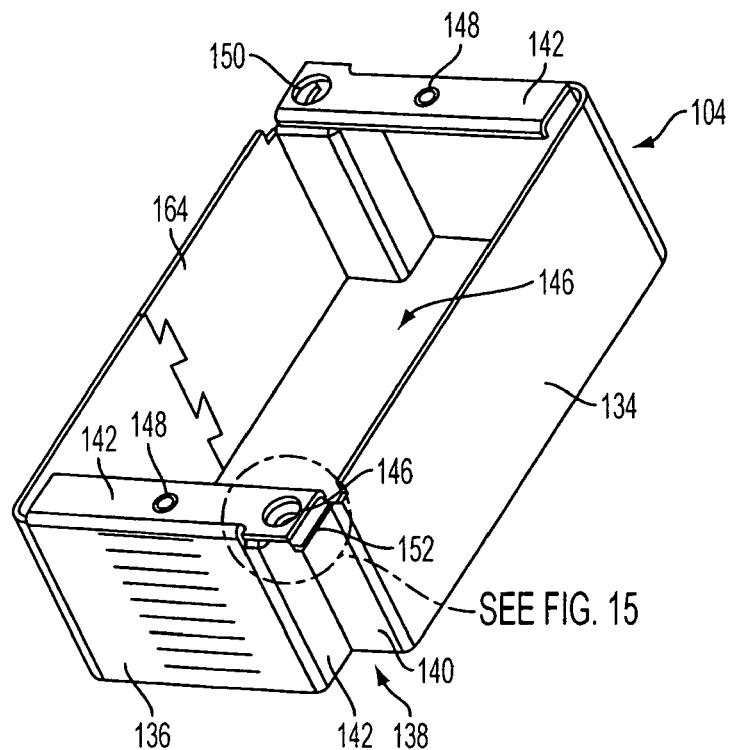
FIG. 14 is a perspective view of the sleeve of the embodiment of FIG. 6.
Figure 15:
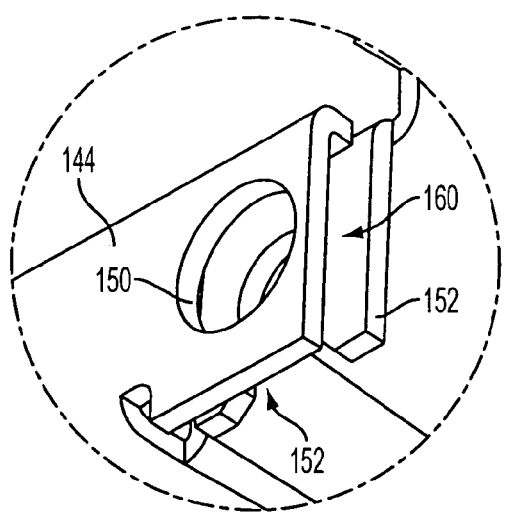
FIG. 15 is an enlarged partial perspective view showing the tabs for capturing the adjustment screw of the sleeve of FIG. 14.
Figure 16:
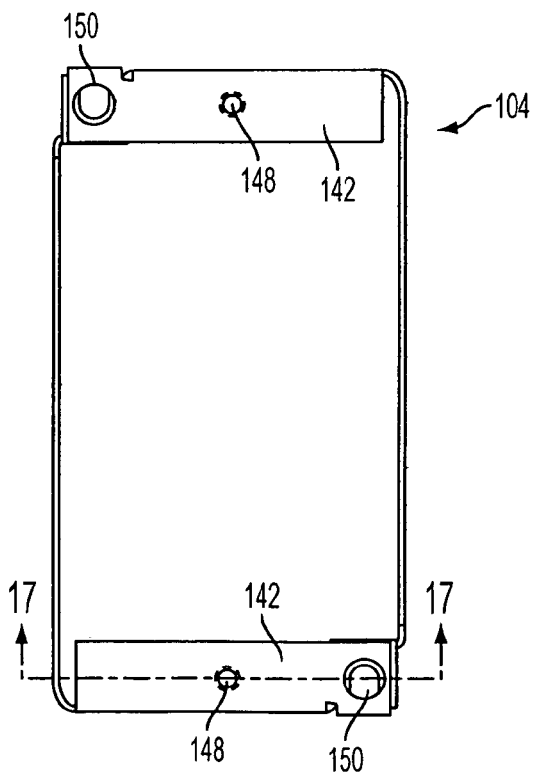
FIG. 16 is a top plan view of the sleeve of FIG. 14.
Figure 17:
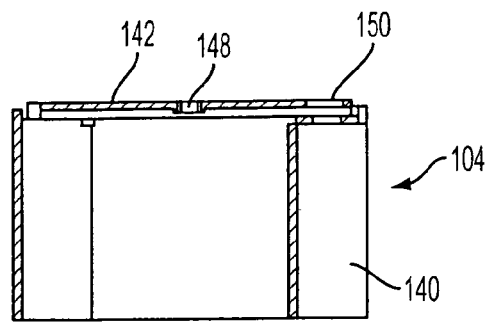
FIG. 17 is a cross-sectional end view of the sleeve of FIG. 14.
Figure 18:
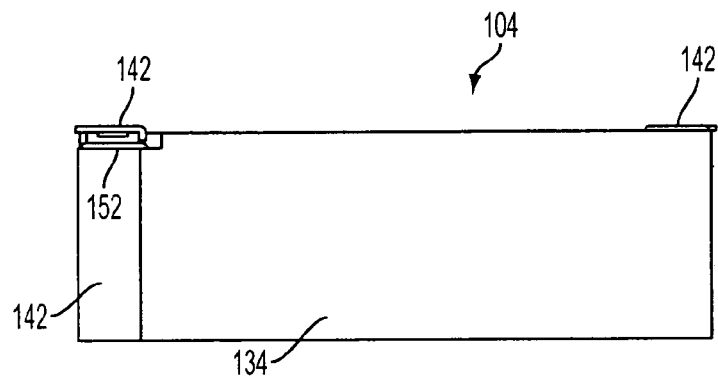
FIG. 18 is a side elevational view of the sleeve of FIG. 14.

Sleeve 104 has a dimension to slide within central opening 112 and the opening of collar 124. Referring to FIG. 14, sleeve 104 has a pair of opposite side walls that are substantially parallel to each other and end walls 36 that are substantially parallel to each other to form sleeve 104 with a substantially rectangular shape. The opposite corners of sleeve 104 are formed with a concave recessed portion 138. As shown in FIG. 14, end wall 136 includes an integrally formed side portion 140 that is folded perpendicular to the plane of end wall 136. Side wall 134 has one end with a side portion integrally formed therewith and extending perpendicular to the plane of side wall 134. The side portions 140 and 142 are joined at an intersection to form recessed portion 138. Recessed portion 138 has a dimension to receive tab 130 to prevent interference of tab 130 during the sliding movement of sleeve 104.

End walls 136 are formed with a mounting flange 144 along the top edge of end wall 136. Mounting flange 144 extends inwardly into the open area 146 of sleeve 104 and is substantially perpendicular to the plane of end wall 136. In the embodiment illustrated, mounting flange 144 has a length substantially equal to the width of sleeve 104. Mounting flange 144 extends inwardly into the open area 146 a distance sufficient to allow an electrical device to be mounted thereto without interfering with the operation of the electrical device. A threaded hole 148 is formed in each mounting flange 144 for receiving a screw or other fastener to attach an electrical device to the mounting flange 144 and sleeve 104.

Figure 19:
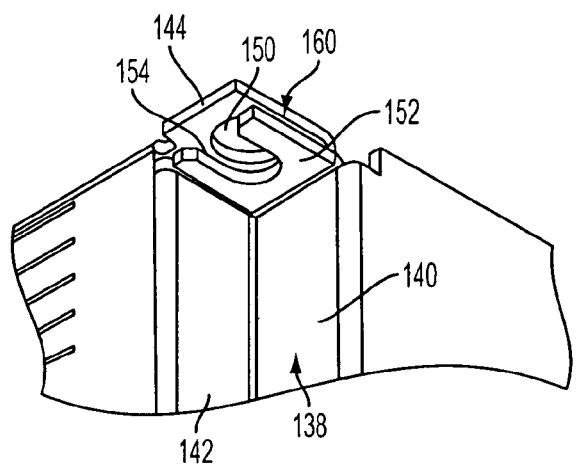
FIG. 19 is a partial perspective view showing the bottom side of the tabs for capturing the adjustment screw.
Figure 20:
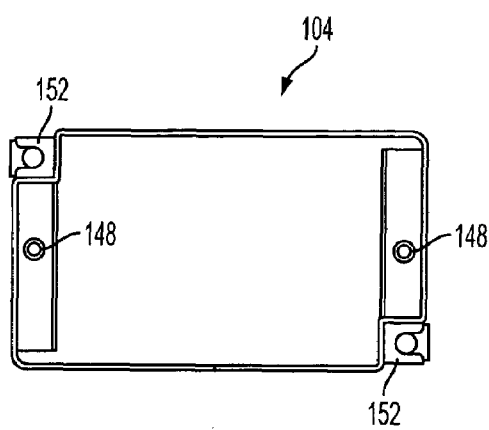
FIG. 20 is a bottom view of the sleeve of FIG. 14.

Mounting flange 144 includes an aperture 50 aligned with the respective recessed portion 138. Side portion 142 of side wall 134 includes a flange 152 that extends into recessed portion 138. As shown in FIGS. 14 and 19, flange 152 is formed at the top end of side portion 142 and is spaced a slight distance from the bottom surface of mounting flange 144. Flange 152 includes a U-shaped slot 154 aligned with aperture 150 in mounting flange 144.

Figure 9:
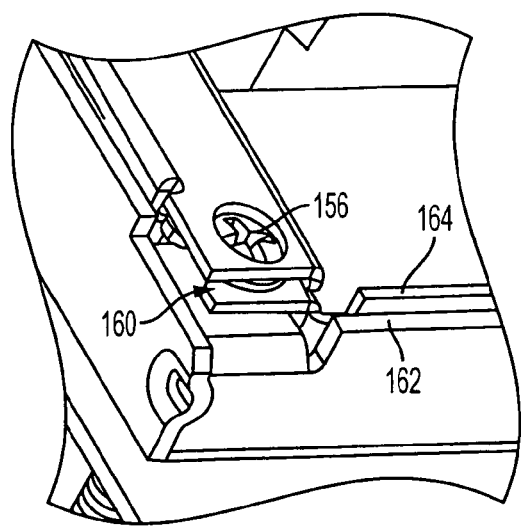
FIG. 9 is an enlarged partial perspective view of the adjustment screw assembly of the sleeve and collar of FIG. 6.

Cover plate assembly 100 is assembled by inserting the head 156 of a threaded screw 158 in the gap 160 between flange 152 and mounting plate 144 by sliding the body of the screw 158 through the slot 154 to align the head of the screw with the aperture 150 in mounting flange 144. In this manner, screw 158 is captured by sleeve 104 and prevented from axial movement with respect to the sleeve 104 while allowing rotational movement. Preferably, aperture 150 in mounting flange 144 has a diameter sufficient to allow the tip of a screw driver to pass through while being smaller than the head 56 of screw 158 so that the head of the screw cannot pass through aperture 150. Sleeve 104 is then positioned within collar 124 and the ends of screw 158 are threaded into threaded hole 132 of tab 130. The screws 158 can be rotated to retract sleeve 104 through central opening 112 and collar 124 until flange 152 contacts tab 130 as shown in FIG. 9. Thus, tab 130 limits the axial movement of sleeve 104 within collar 124. In the retracted position, the top edge 162 of collar 124 is closely spaced to top edge 164 of sleeve 104. In the embodiment illustrated, end wall 136 of sleeve 104 includes measurement lines and indicia 166 to assist the user in adjusting the position of the sleeve 104 depending on the thickness of the wall structure and the position of the electrical box.

Figure 8:
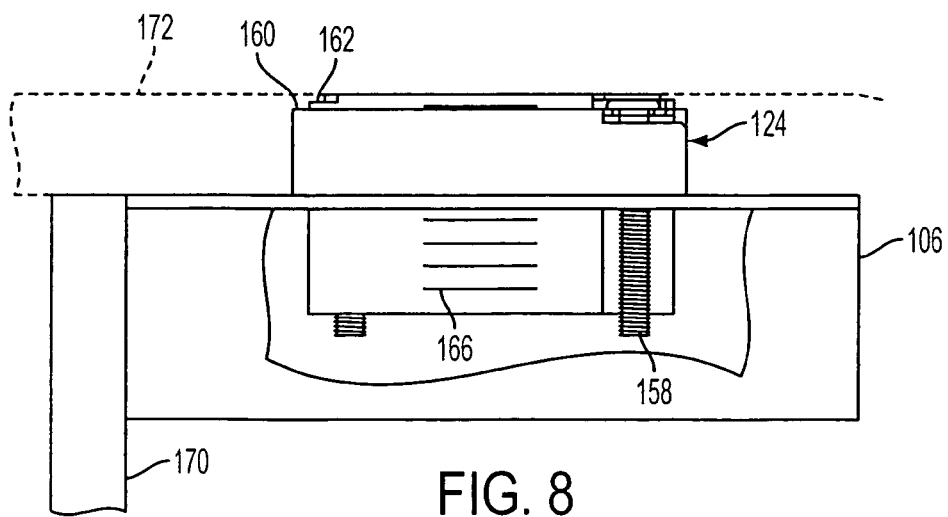
FIG. 8 is an elevational end view of the electrical box cover plate of FIG. 6.

As depicted in FIG. 8, cover plate assembly 100 is attached to electrical box 106 by screws 168. Electrical box 106 is attached to a wall stud 170 or other support which supports a wall structure 172. Typically, collar 124 has a height substantially equal to the thickness of wall 172 so that the electrical device attached to sleeve 104 is flush with the outer surface of the wall structure 172. In situations where the wall thickness is thicker than standard wall thicknesses or is spaced outwardly from the wall stud as shown in phantom lines in FIG. 8, screws 158 are rotated to adjust the position of sleeve 104 so that top edge 164 of sleeve 104 can be properly aligned with the outer surface of the wall structure 172.

Figure 21:
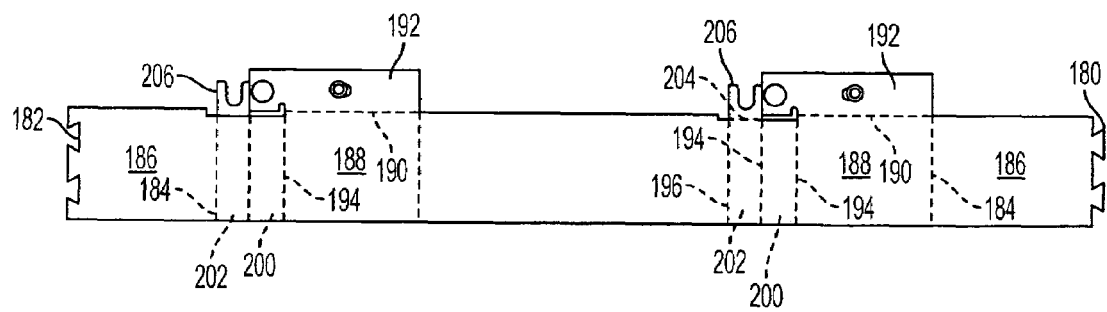
FIG. 21 is a top plan view of a blank for forming the sleeve and showing the fold lines for forming the sleeve according to the invention.

In one embodiment of the invention, sleeve 104 is formed from a stamped blank formed from a sheet of steel or other rigid material. Blank 174 as shown in FIG. 21, has a longitudinal dimension with ends 76 and 78. End 76 is formed with dovetail shaped projections 180 and end 178 is formed with complementing dovetail shaped recesses 182. A series of parallel fold lines 184 extend perpendicular to the longitudinal direction to form the walls of sleeve 104. Blank 174 is formed with a first panel 186 forming a portion of a first side wall 134 and is separated from a panel 188 by a fold line 184 for forming a first end wall 122. A fold line 190 extends between a panel 192 for forming a first mounted flange 144. Fold lines 194, 196 and 198 separate panels 200 and 202 for forming the side portions 140 and 142 of the recessed portion 138. A fold line 204 separates a panel 206 for forming the flange 152.

While various embodiments have been chosen to illustrate the invention, it will be understood by those skilled in the art that various changes and modifications can be made by one of ordinary skill in the art without departing from the spirit and scope of the invention as defined in the appended claims.

What is claimed is:

1. An electrical box cover plate for coupling to an electrical box, said cover plate comprising:
    a planar base plate having an outer face, an inner face and a central opening having a dimension sufficient to receive an electrical device, said base plate being adapted for coupling to said electrical box;
    a collar surrounding said central opening and extending axially from said outer face of said base plate, said collar having an inwardly extending tab at opposite corners of said central opening and having an aperture therein;
    a sleeve slidingly received in said collar and being movable axially within said collar, said sleeve having a tab at a bottom edge with a threaded hole therein at opposite corners of said sleeve and being aligned with said tabs of said collar; and
    a threaded screw received in each said threaded hole of said tab of said sleeve, and having an end rotatably coupled with and axially fixed with respect to said tab of said collar, wherein rotation of said screw adjusts said sleeve axially with respect to said collar.

2. The cover plate of claim 1, wherein
    said collar includes first and second opposite side walls integrally formed with said cover plate and extending from first and second opposite side edges of said central opening, third and fourth side walls separately formed from said first and second side walls, said third and fourth side walls having opposite ends coupled to respective opposite ends of said first and second side walls, and having a longitudinal bottom edge contacting third and fourth side edges of said central opening.

3. The cover plate of claim 2, wherein
    said third and fourth side wall of said collar have a leg extending downwardly through said central opening and where said tab of said collar extends from an axial end of said leg whereby said tab is spaced from the back face of said base plate.

4. The cover plate of claim 2, wherein
    said leg has a length whereby said sleeve is adjustable between a first position where a top edge of said sleeve is substantially even with a top end of said collar and an extended position where said top edge of said sleeve is spaced outwardly from said top edge of said collar.

5. The cover plate of claim 2, wherein said third and fourth side walls of said collar are coupled to ends of said first and second side walls of said collar by crimping.

6. The cover plate of claim 1, wherein said aperture in said tab of said collar has an open side defining a slot with a concave surface therein, and wherein said threaded screw has a notch received in said slot.

7. An electrical box cover plate comprising:
    a base plate having an outer face, an inner face and a plurality of coupling members for coupling said plate to an electrical box, said base plate having a central opening;
    a first side wall integrally formed with a first edge of said central opening;
    a second side wall integrally formed with a second opposite edge of said central opening and being substantially parallel to said first side wall and perpendicular to said base plate;
    a third side wall formed as a separate member and coupled to a third edge of said central opening and to first ends of said first and second side walls;
    a fourth side wall formed as a separate member and coupled to a fourth edge of said central opening and to a second end of said first and second side walls, said first, second, third and fourth side walls defining a collar extending from said outer face of said base plate;
    first and second tabs integrally formed with side walls of said collar and extending inwardly with respect to said central opening and having an aperture therein;
    a sleeve received within said central opening and having a pair of integrally formed tabs aligned with each of said tabs of said side walls and having an aperture therein; and
    an adjusting screw received in each said aperture of said tabs of said sleeve and cooperating with an aligned opening in said tabs of said side walls of said collar for telescopically adjusting the position of said sleeve with respect to said collar.

8. The cover plate of claim 7, wherein
said first and second tabs on said side walls of said collar are integrally formed with said third and fourth side walls and extend inwardly from an upper edge thereof with respect to said central opening.

9. The cover plate of claim 8, wherein
said sleeve includes an assembly at a top edge for capturing a head of said adjusting screw whereby rotation of said adjusting screw adjusts the position of the sleeve with respect to the collar.

10. The cover plate of claim 9, wherein
said sleeve has first and second opposite side walls having a first tab extending inwardly with respect to said central opening of said base plate, said first tab having a hole therein; and
said sleeve having third and fourth opposite side walls with a flange overlying and spaced from said first tab a distance to capture the head of said adjusting screw that extends through said hole in said first tab.

11. The cover plate of claim 10, wherein said flange has an aperture to allow access to said screw head and said aperture having a dimension less than an outer dimension of said screw head.

12. The cover plate of claim 11, wherein the hole of said first tab is a slot having a width sufficient to receive said adjustment screw.

13. The cover plate of claim 10, wherein said hole in said tab on each of said first and second side walls of said sleeve is positioned outside said sleeve and within said collar, and wherein said aperture in said flange is positioned outside said sleeve and within said collar.

14. The cover plate of claim 10, wherein said first side wall and said third side wall of said sleeve intersect at a first recessed portion and where said first tab and flange overlie said first recessed portion, whereby said adjustment screw is outside said sleeve and within said collar.

15. The cover plate of claim 14, wherein said first side wall of said sleeve includes a first end panel extending perpendicular to said first side wall, and wherein said third side wall of said sleeve includes a second end panel extending perpendicular to said third side wall and said first end panel, said first and second end panels defining said first recessed area.

16. The cover plate of claim 15, wherein said second side wall of said sleeve includes a third end panel extending perpendicular to said second side wall and is joined to said first end panel to define said first recessed area.

17. The cover plate of claim 14, wherein said second side wall and said fourth side wall of said sleeve intersect to define a second recessed portion, and where said respective first tabs and flange overlie said second recessed portion whereby said respective adjustment screw is positioned outside said sleeve and within said collar.

18. An electrical box cover plate for coupling to an electrical box, said cover plate comprising:
a base plate having an outer face, an inner face and a central opening having a dimension for receiving an electrical device;
first and second opposite side walls integrally formed with opposite side edges of said central opening and extending substantially perpendicular to said base plate;
third and fourth opposite side wall members separately formed from said base plate and being attached to opposite ends of said first and second side walls and to opposite side edges of said central opening, said first, second, third and fourth side walls forming a collar extending from said outer face of said base plate and encircling said central opening;
at least one leg extending from said collar away from said inner face of said base plate and having a tab extending inwardly with respect to said central opening, said tab having an opening therein;
a sleeve slidably received in said collar and having a top edge for mounting an electrical device, said sleeve having at least one tab extending inwardly with respect to said sleeve and having a threaded aperture; and
a threaded screw having a first end rotatably coupled and axially fixed to said tab of said leg and threadedly coupled to said tab of said sleeve, wherein rotation of said screw adjusts the axial position of the sleeve with respect to the collar.

19. The electrical box of claim 18, wherein
said at least one leg is a leg integrally formed with each of said third and fourth side walls of said collar and extends downwardly in the plane of said respective side wall,
and where an inner edge of said central opening has a recess to receive said leg.

20. The electrical box of claim 19, wherein
said opening in said at least one tab is a slot having a concave portion for capturing an end of said threaded adjustment screw to limit axial movement of said screw while allowing rotational movement of said screw.

21. The electrical box of claim 18, wherein said tab on said collar extends from a bottom edge of said sleeve and is aligned with said tab extending from said leg.

22. An electrical box and adjustable cover plate assembly comprising:
an electrical box having an open top end and having an inner cavity for receiving electrical wiring;
a cover plate assembly comprising a planar base plate having an outer face and an inner face and a central opening, said base plate having a dimension to cover said open top end of said electrical box;
first and second opposite side walls integrally formed with opposite side edges of said central opening and extending substantially perpendicular to said base plate;
third and fourth opposite side wall members separately formed from said base plate and being attached to opposite ends of said first and second side walls and to respective edges of said central opening, said first, second, third and fourth side walls forming a collar extending from said base plate, said collar having a tab extending inwardly at opposite corners of said collar and said tab having an opening therein;
a sleeve slidably received in said collar and being movable from a retracted position where a top edge of said sleeve is substantially aligned with a top edge of said collar and an extended position where said top edge of said sleeve is spaced from said top edge of said collar, a tab extending from opposite corners of said sleeve and having an opening therein;
threaded adjustment screws received in said opening in respective tabs on said sleeve and respective tabs on said collar, said screws being positioned between an inner surface of said collar and an outer surface of said sleeve, each said screw being axially fixed to one of said tabs.

23. The assembly of claim 22, wherein
each of said adjustment screws are captured by a respective tab on said collar to prevent axial movement while allowing rotational movement with respect to said sleeve and where said screw is threaded into said opening in said tab on said sleeve.

24. The assembly of claim 23, wherein
said sleeve includes a recessed area at opposite corners, and said tab and flange of said sleeve overlie a top end of said recessed area.

25. The assembly of claim 24, wherein said tabs of said collar extend inwardly from a top edge of said collar.

26. The assembly of claim 22, wherein
said sleeve includes a flange spaced from said tab on said sleeve a distance to capture the head on the adjustment screw to prevent axial movement of the adjustment screw while allowing rotational movement of the screw to adjust the position of the sleeve relative to the collar.

* * * * *

EX PARTE REEXAMINATION CERTIFICATE (7741st)

United States Patent
Korcz

(10) Number: US 7,301,099 C1
(45) Certificate Issued: Sep. 14, 2010

(54) ELECTRICAL BOX MOUNTING PLATE

(75) Inventor: Krzysztof W. Korcz, Granger, IN (US)

(73) Assignee: Hubbell Incorporated, Orange, CT (US)

Reexamination Request:
No. 90/010,111, Feb. 25, 2008

Reexamination Certificate for:
Patent No.: 7,301,099
Issued: Nov. 27, 2007
Appl. No.: 11/478,525
Filed: Jun. 30, 2006

(51) Int. Cl.
*H01H 9/02* (2006.01)

(52) U.S. Cl. ............ 174/58; 174/66; 174/67; 174/135; 33/528; 220/241

(58) Field of Classification Search ............ None
See application file for complete search history.

(56) References Cited

U.S. PATENT DOCUMENTS

| 3,344,499 A | 10/1967 | Cowsert |
| 3,980,197 A | 9/1976 | Ware |
| 5,012,043 A | 4/1991 | Seymour |
| 5,931,325 A | 8/1999 | Filipov |
| 6,820,760 B2 | 11/2004 | Wegner et al. |
| 2005/0082079 A1 | 4/2005 | Wegner et al. |

*Primary Examiner*—Margaret Rubin

(57) ABSTRACT

An electrical box assembly includes an adjustable electrical box cover. The cover includes a base plate having a central opening and a collar encircling the central opening. A sleeve slides through the collar and is adjusted by a plurality of adjustment screws. In one embodiment, the adjustment screws are positioned between the sleeve and the collar. In another embodiment, the sleeve and collar have inwardly extending tabs to receive the adjustment screws.

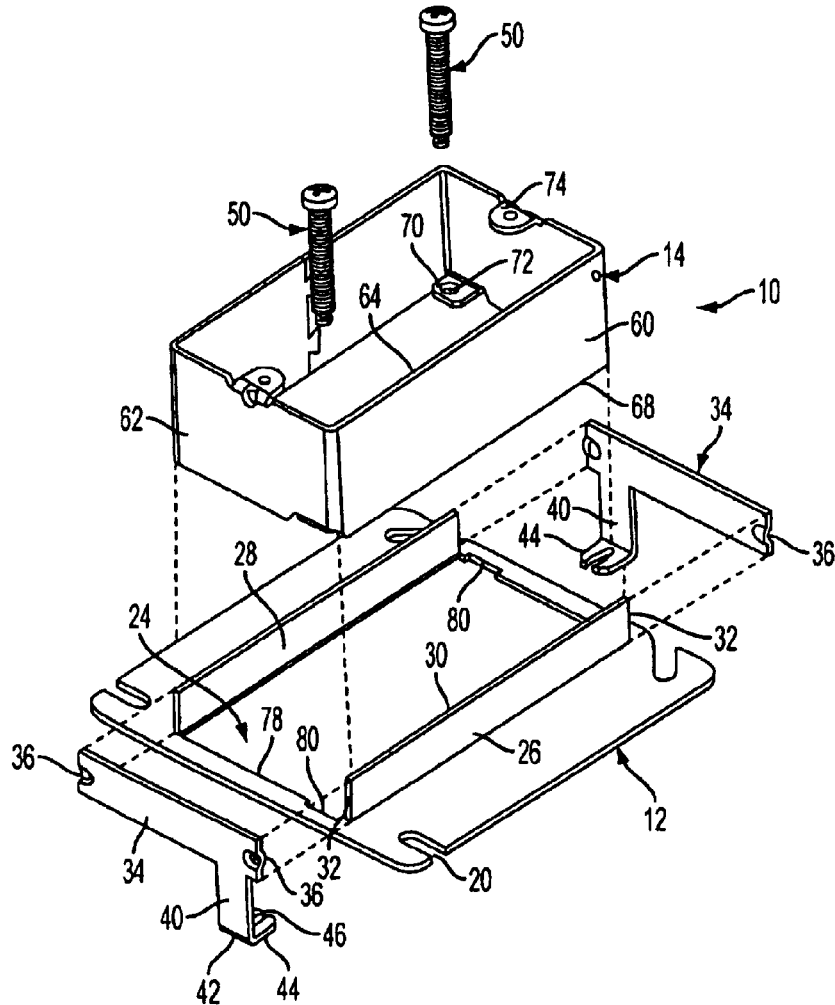

US 7,301,099 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, line 55 to column 8, line 11:

Base plate 108 is formed with a central opening 112 having a substantially rectangular configuration in the embodiment shown although other configurations can be used. Central opening 112 has a dimension and shape to accommodate sleeve 104 as discussed hereinafter in greater detail. Base plate 108 is formed from a sheet of steel with flanges formed on opposite sides of central opening 112 that are bent upwardly perpendicular to the plane of base plate 108 to form side walls 114 and 116. Side walls 114 and 116 have a length substantially equal to the lenght of central opening 112 and have a longitudinal top edge 118 and opposite end faces 120. In the embodiment illustrated, side walls 114 and 116 are integrally formed with base plate 108. End walls [22] *122* are attached to the end faces 120 of side walls 114 and 116 to define a collar 124. Collar 124 encircles central opening 112 and extends substantially perpendicular to the plane of base plate 108. End walls 122 are formed as separate members that are attached to end faces 120 by crimping as shown in FIG. 11, spot welding or other attachment means. End walls 122 have a length to extend between side walls 114 and 116 and a height substantially equal to the height of side walls 114 and 116. In this embodiment, end walls 122 contact the outer face of base plate 108 adjacent the edge of central opening 112.

Column 8, lines 12-24:

As shown in FIGS. 10 and 11, end walls 122 have a top edge [26] *126* with a notch formed at one end and are positioned in opposite corners of central opening 112. Notch 128 has an edge extending parallel to top edge 126 and extends inwardly from the end of each end wall 122. Side walls 114 and 116 are formed with an integral tab 130 that is bent inwardly with respect to central opening 122. Tabs 130 extend substantially perpendicular to side walls 112 and 114 and parallel to the top surface of base plate 108. Tabs 130 have a length substantially equal to the length of notch 128 and are aligned with the top edge of notch 128. A threaded hole 132 is formed in each tab 130 for receiving an adjustment screw as discussed herein.

Column 8, lines 25-40:

Sleeve 104 has a dimension to slide within central opening 112 and the opening of collar 124. Referring to FIG. 14, sleeve 104 has a pair of opposite side walls that are substantially parallel to each other and end walls [36] *136* that are substantially parallel to each other to form sleeve 104 with a substantially rectangular shape. The opposite corners of sleeve 104 are formed with a concave recessed portion 138. As shown in FIG. 14, end wall 136 includes an integrally formed side portion 140 that is folded perpendicular to the plane of end wall 136. Side wall 134 has one end with a side portion integrally formed therewith and extending perpendicular to the plane of side wall 134. The side portions 140 and 142 are joined at an intersection to form recessed portion 138. Recessed portion 138 has a dimension to receive tab 130 to prevent interference of tab 130 during the sliding movement of sleeve 104.

Column 8, lines 54-61:

Mounting flange 144 includes an aperture [50] *150* aligned with the respective recessed portion 138. Side portion 142 of side wall 134 includes a flange 152 that extends into recessed portion 138. As shown in FIGS. 14 and 19, flange 152 is formed at the top end of side portion 142 and is spaced a slight distance from the bottom surface of mounting flange 144. Flange 152 includes a U-shaped slot 154 aligned with aperture 150 in mounting flange 144.

Column 8, l line 62 to column 9, line 18:

Cover plate assembly 100 is assembled by inserting the head 156 of a threaded screw 158 in the gap 160 between flange 152 and mounting plate 144 by sliding the body of the screw 158 through the slot 154 to align the head of the screw with the aperture 150 in mounting flange 144. In this manner, screw 158 is captured by sleeve 104 and prevented from axial movement with respect to the sleeve 104 while allowing rotational movement. Preferably, aperture 150 in mounting flange 144 has a diameter sufficient to allow the tip of a screw driver to pass through while being smaller than the head [56] *156* of screw 158 so that the head of the screw cannot pass through aperture 150. Sleeve 104 is then positioned within collar 124 and the ends of screw 158 are threaded into threaded hole 132 of tab 130. The screws 158 can be rotated to retract sleeve 104 through central opening 112 and collar 124 until flange 152 contacts tab 130 as shown in FIG. 9. Thus, tab 130 limits the axial movement of sleeve 104 within collar 124. In the retracted position, the top edge 162 of collar 124 is closely spaced to top edge 164 of sleeve 104. In the embodiment illustrated, end wall 136 of sleeve 104 includes measurement lines and indicia 166 to assist the user in adjusting the position of the sleeve 104 depending on the thickness of the wall structure and the position of the electrical box.

Column 9, lines 32-47:

In one embodiment of the invention, sleeve 104 is formed from a stamped blank formed from a sheet of steel or other rigid material. [Blank 174] *The blank* as shown in FIG. 21, has a longitudinal dimension with *two* ends [76 and 78]. [End 76] *One end* is formed with dovetail shaped projections 180 *the other* end [178] is formed with complementing dovetail shaped recesses 182. A series of parallel fold lines 184 extend perpendicular to the longitudinal direction to form the walls of sleeve 104. [Blank 174] *The blank* is formed with a first panel 186 forming a portion of a first side wall 134 and is separated from a panel 188 by a fold line 184 for forming a first end wall 122. A fold line 190 extends between a panel 192 for forming a first mounted flange 144. Fold lines 194, 196 and 198 separate panels 200 and 202 for forming the side portions 140 and 142 of the recessed portion 138. A fold line 204 separates a panel 206 for forming the flange 152.

AS A RESULT OF REEXAMINATION, IT HAS BEEN DETERMINED THAT:

The patentability of claims 22-26 is confirmed.

Claims 6 and 19 are cancelled.

Claims 1, 7, 8, 18 and 20-21 are determined to be patentable as amended.

Claims 2-5 and 9-17, dependent on an amended claim, are determined to be patentable.

New claims 27-29 are added and determined to be patentable.

1. An electrical box cover plate for coupling to an electrical box, said cover plate comprising:
a planar base plate having an outer face, an inner face and a central opening having a dimension sufficient to receive an electrical device, said base plate being adapted for coupling to said electrical box;
a collar surrounding said central opening and extending axially from said outer face of said base plate, said collar having an inwardly extending tab at opposite corners of said central opening and having an aperture therein *with an open side defining a slot*;
a sleeve slidingly received in said collar and being movable axially within said collar, said sleeve having a tab at a bottom edge with a threaded hole therein at opposite corners of said sleeve and being aligned with said tabs of said collar; and
a threaded screw received in each said threaded hole of said tab of said sleeve, and having an end *with a notch received in said slot and* rotatably coupled with and axially fixed with respect to said tab of said collar, wherein rotation of said screw adjusts said sleeve axially with respect to said collar.

7. An electrical box cover plate comprising:
a base plate having an outer face, an innner face and a plurality of coupling members for coupling said plate to an electrical box, said base plate having a central opening;
a first side wall integrally formed with a first edge of said central opening;
a second side wall integrally formed with a second opposite edge of said central opening and being substantially parallel to said first side wall and perpendicular to said base plate;
a third side wall formed as a separate member and coupled to a third edge of said central opening and to first ends of said first and second side walls;
a fourth side wall formed as a separate member and coupled to a fourth edge of said central opening and to a second end of said first and second side walls, said first, second, third and fourth side walls defining a collar extending from said outer face of said base plate;
first and second tabs integrally formed with *an upper edge of* side walls of said collar and extending inwardly with respect to said central opening and having an aperture therein;
a sleeve received within said central opening and having a pair of integrally formed tabs aligned with each of said tabs of said side walls and having an aperture therein; and
an adjusting screw received in each said aperture of said tabs of said sleeve and cooperating with an aligned opening in said tabs of said side walls of said collar for telescopically adjusting the position of said sleeve with respect to said collar.

8. The cover plate of claim 7, wherein
said first and second tabs on said side walls of said collar are integrally formed with said [third and fourth side walls and extend inwardly from an upper edge thereof with respect to said central opening] *first and second side walls*.

18. An electrical box cover plate for coupling to an electrical box, said cover plate comprising:
a base plate having an outer face, an innner face and a central opening having a dimension for receiving an electrical device;
first and second opposite side walls integrally formed with opposite side edges of said central opening and extending substantially perpendicular to said base plate;
a third and fourth opposite side wall members separately formed from said base plate and being attached to opposite ends of said first and second side walls and to opposite side edges of said central opening, said first, second, third and fourth side walls forming a collar extending from said outer face of said base plate and encircling said central opening;
at least one leg *integrally formed with each of said third and fourth side walls of said collar and* extending from said collar *downwardly in the plate of said respective side wall* away from said inner face of said base plate and having a tab extending inwardly with respect to said central opening, said tab having an opening therein *and where an inner edge of said central opening has a recess to receive said leg*;
a sleeve slidably received in said collar and having a top edge for mounting an electrical device, said sleeve having at least one tab extending inwardly with respect to said sleeve and having a threaded aperture; and
a threaded screw having a first end rotatably coupled and axially fixed to said tab of said leg and threadedly coupled to said tab of said sleeve, wherein rotation of said screw adjusts the axial position of the sleeve with respect to the collar.

20. The electrical box of claim [19] *18*, wherein said opening in said at least one tab is a slot having a concave portion for capturing an end of said threaded adjustment screw to limit axial movement of said screw while allowing rotational movement of said screw.

21. The electrical box of claim 18, wherein said tab on said [collar] *sleeve* extends from a bottom edge of said sleeve and is aligned with said tab extending from said leg.

*27. An electrical box cover plate for coupling to an electrical box, said cover plate comprising:*
*a planar base plate having an outer face, an inner face, an outer peripheral edge, and an inner peripheral edge defining a central opening having a dimension sufficient to receive an electrical device, said base plate being adapted for coupling to said electrical box;*
*a collar surrounding said central opening and extending axially from said outer face of said base plate, said collar having an inwardly extending tab at opposite corners of said central opening and having an aperture therein, and a leg at the opposite corners of said central opening extending axially through said central opening, and where said tab is coupled to a distal end of a respective leg;*
*a sleeve slidingly received in said collar and being movable axially within said collar, said sleeve having a tab at a bottom edge with a threaded hole therein at opposite corners of said sleeve and being aligned with said tabs of said collar; and*
*a threaded screw received in each said threaded hole of said tab of said sleeve, and having an end rotatably coupled to an axially fixed with respect to said tab of one of said legs on said collar, wherein rotation of said screw adjusts said sleeve axially with respect to said collar.*

*28. The electrical box cover plate of claim 27, wherein said threaded screw has a distal end with an annular recess received in said aperture in said tabs for coupling said screw to said tabs.*

*29. The electrical box cover plate of claim 28, wherein said aperture in said tabs has an open side defining a slot for receiving said annular recess of said screw.*

* * * * *